United States Patent Office 3,636,000
Patented Jan. 18, 1972

3,636,000
METHOD FOR PREPARING DITHIOURAZOLE
Michael J. Spitulnik, Rochester, N.Y., assignor to Eastman Kodak Company, Rochester, N.Y.
No Drawing. Filed Sept. 8, 1969, Ser. No. 856,148
Int. Cl. C07d 55/06
U.S. Cl. 260—308 C                               6 Claims

ABSTRACT OF THE DISCLOSURE

Dithiourazole is prepared by dissolving 2,5-dithiobiurea and an alkali metal carbonate in water in a proportion of at least about 0.5 mole of alkali metal carbonate per mole of 2,5-dithiobiurea and heating the resulting solution. In the presence of the alkali metal carbonate, ring closure of the 2,5-dithiobiurea occurs to yield dithiourazole and release ammonia. Optimum results are obtained by heating at reflux under an inert atmosphere for a period of at least several hours.

---

This invention relates to the compound dithiourazole and in particular to a novel method for preparing dithiourazole from 2,5-dithiobiurea.

It is known to prepare dithiourazole by reaction of 2,5-dithiobiurea with an aqueous solution of an alkali metal hydroxide. However, the reaction mechanism involved is a complex one and competing reactions occur which lead to unwanted by-products, the chief such by-product usually being 3-amino-5-mercaptotriazole. In one reaction, the 2,5-dithiobiurea forms a monoanion which, in the presence of hydroxide, undergoes a slow ring closure, expelling ammonia and forming dithiourazole. In a competing reaction, the 2,5-dithiobiurea forms a dianion which, in the presence of hydroxide, undergoes a relatively fast ring closure, expelling hydrogen sulfide and forming 3-amino-5-mercaptotriazole. These reactions can be illustrated by the following equations:

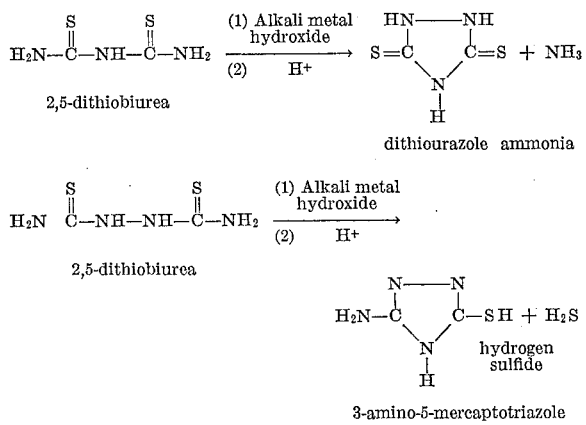

The use of concentrated alkali metal hydroxide solution favors the formation of the dianion of 2,5-dithiobiurea so that the major product formed under such circumstances is 3-amino-5-mercaptotriazole, while the use of dilute alkali metal hydroxide solution favors the formation of the monoanion of 2,5-dithiobiurea so that the major product formed is dithiourazole. This is illustrated by British Pat. 1,049,053 which teaches the preparation of dithiourazole from 2,5-dithiobiurea by using relatively large volumes of dilute aqueous solution of alkali metal hydroxide, i.e. one to six equivalents of alkali metal hydroxide for each mole of 2,5-dithiobiurea with the strength of the alkali metal hydroxide solution being in the range of 0.2 to 2 normal. This method suffers from serious shortcomings which render impractical its use on a production scale. In particular, it is accompanied by the formation of substantial amounts of 3-amino-5-mercaptotriazole, as well as unwanted by-products resulting from hydrolysis reactions, e.g. the hydrazine salt of dithiourazole. Since relatively dilute solutions of hydroxide must be used, i.e. a concentration of 2 normal or less, it results in inefficient utilization of equipment, i.e. larger volume equipment must be used than would be the case could more concentrated solutions be employed. Moreover, the yields of dithiourazole attainable on a laboratory scale are not duplicated in production scale equipment because, on a production scale, a substantial period of time is necessary to heat the solution up to the desired temperature and during this period reactions leading to the unwanted by-products occur, particularly hydrolysis reactions which apparently predominate at temperatures significantly below reflux.

It has now been discovered that dithiourazole can be produced with minimum formation of unwanted by-products by heating together, in aqueous solution, 2,5-dithiobiurea and an alkali metal carbonate. Use of an alkali metal carbonate makes it possible to obtain significantly higher yields at the same reactant ratios or to obtain the same yield attainable with an alkali metal hydroxide with a substantially more concentrated solution and thereby achieve more efficient utilization of equipment. Moreover, in contrast with the results obtained when using an alkali metal hydroxide, by the use of an alkali metal carbonate satisfactory yields of dithiourazole can be obtained on a production scale as well as on a laboratory scale.

More specifically, the method of this invention comprises the steps of mixing 2,5-dithiobiurea, water and an alkali metal carbonate in a proportion of at least about 0.5 mole of alkali metal carbonate per mole of 2,5-dithiobiurea and with at least sufficient water to dissolve the 2,5-dithiobiurea and alkali metal carbonate, and heating the resulting solution for a sufficient period of time to form dithiourazole. It is preferred to employ the alkali metal carbonate in a proportion of at least about one mole per mole of 2,5-dithiobiurea, and particularly preferred to employ a proportion of from about 1.5 to about 4 moles of alkali metal carbonate per mole of 2,5-dithiobiurea.

While applicant is not certain of the theoretical explanation for the surprising results he has discovered, it appears that the reaction whereby 2,5-dithiobiurea forms a monoanion which undergoes ring closure to form dithiourazole, as hereinabove described, is favored by alkali metal carbonates in comparison with alkali metal hydroxides. Thus, even in small scale preparations, a greater yield of dithiourazole is achieved with the carbonate since there is less formation of 3-amino-5-mercaptotriazole. In large scale preparations, the use of the carbonate is even more advantageous since hydrolysis reactions which occur while the solution is being heated to reflux take place to a much lesser degree in the presence of carbonates than in the presence of hydroxides.

Examples of the alkali metal carbonates which can be utilized in the method of this invention are sodium carbonate ($Na_2CO_3$) and potassium carbonate ($K_2CO_3$). The alkali metal carbonates can be utilized in their anhydrous or hydrated forms and can be employed singly or as a mixture of two or more different carbonates. Bicarbonates, e.g. sodium bicarbonate of the formula $NaHCO_3$, do not work so that the term "alkali metal carbonate," as employed herein, is not intended to include bicarbonates.

The solution comprising 2,5-dithiobiurea, water and alkali metal carbonate is preferably heated at reflux. To effect completion of the reaction, heating at reflux should be continued for at least several hours and, advantageously, for at least about 20 hours. Heating under inert atmosphere, e.g. nitrogen gas, is preferred as this aids in avoiding the formation of impurities. The amount of water utilized will be determined by striking a reasonable balance between the considerations of yield and equipment capacity since increasing the amount of water tends, within reasonable limits, to increase the yield of dithiourazole but requires the use of larger equipment. An amount of water of at least about 300 milliliters per mole of alkali metal carbonate is necessary to dissolve the reactants.

The dithiourazole can be recovered upon completion of the reaction by any convenient procedure. For example, the reaction mixture can be cooled, acidified with a strong acid such as hydrochloric acid, concentrated by evaporation or other suitable technique to precipitate the dithiourazole, and filtered to separate the dithiourazole from the solution. Purification of the precipitate can be effected, if necessary, by repeated recrystallization from water or alcohol.

The invention is further illustrated by the following examples of its practice.

EXAMPLE 1

Dithiourazole was prepared on a laboratory scale by dissolving 2,5-dithiobiurea and sodium carbonate in water and heating the solution at reflux under a nitrogen atmosphere for a period of about 20 hours. The product was isolated by acidifying the reaction mixture with hydrochloric acid and concentrating at reduced pressure and a temperature of 50° C. until crystals precipitated. In each case, the yield was calculated by multiplying the percent crude yield by the percent purity of the crude product as determined by ultraviolet spectroscopy. The effect of varying the volume of water at a fixed ratio of two moles of base per mole of 2,5-dithiobiurea is illustrated by the data reported in Table I which includes, for purposes of comparison, the results obtained when sodium hydroxide was used in place of sodium carbonate under otherwise identical conditions.

TABLE I

| Moles of 2,5-dithiobiurea— | Moles of base | Volume of water (mls.) | Normality | Yield of dithiourazole (percent) |
|---|---|---|---|---|
| Using NaOH as the base: | | | | |
| 0.5 | 1 | 300 | 3.33 | 46.5 |
| 0.5 | 1 | 500 | 2 | 62.5 |
| 0.5 | 1 | 750 | 1.33 | 59.0 |
| 0.5 | 1 | 1,250 | 0.8 | 72.0 |
| Using $Na_2CO_3$ as the base: | | | | |
| 0.5 | 1 | 300 | 6.66 | 56.5 |
| 0.5 | 1 | 500 | 4 | 74.0 |
| 0.5 | 1 | 750 | 2.66 | 85.5 |
| 0.5 | 1 | 1,250 | 1.6 | 88.0 |

As illustrated by the results shown in Table I, a significantly higher yield is achieved in each case by the use of sodium carbonate rather than sodium hydroxide.

EXAMPLE 2

To further compare the yields obtainable with sodium carbonate relative to those obtainable with sodium hydroxide, laboratory tests were carried out in the same manner as described in Example 1 but using larger amounts of reactants. Results obtained are summarized in Table II.

TABLE II

| Moles of 2,5-dithiobiurea | Base employed | Moles of base | Volume of water (mls.) | Yield of dithiourazole (percent) |
|---|---|---|---|---|
| 1 | NaOH | 2 | 2,000 | 64.0 |
| 1 | $Na_2CO_3$ | 2 | 2,000 | 83.0 |
| 10 | $Na_2CO_3$ | 20 | 17,000 | 82.0 |

As in Example 1, a substantially higher yield of dithiourazole was obtained by using sodium carbonate in place of sodium hydroxide.

EXAMPLE 3

Dithiourazole was prepared in the same manner as described in Example 1, but utilizing 0.5 mole of 2,5-dithiobiurea and one mole of potassium carbonate ($K_2CO_3$) in 800 milliliters of water. The dithiourazole was recovered in a yield of 67.0%.

EXAMPLE 4

Laboratory tests were carried out to determine the effect of varying the ratio of sodium carbonate to 2,5-dithiobiurea while maintaining a fixed volume of water. Using 0.25 moles of sodium carbonate and 0.5 moles of 2,5-dithiobiurea in 1000 milliliters of water gave a yield of dithiourazole of 41.0%, while the use of 0.5 moles of sodium carbonate and 0.5 mole of 2,5-dithiobiurea in 1000 milliliters of water give a yield of dithiourazole of 53.0%. By interpolating the data of Table I, it is seen that using one mole of sodium carbonate and 0.5 moles of 2,5-dithiobiurea in 1000 milliliters of water will give a yield of dithiourazole of about 87%.

EXAMPLE 5

To establish the feasibility of producing dithiourazole on a commercial scale, tests were conducted comparing the use of sodium carbonate with the use of sodium hydroxide using production scale equipment. Heating was carried out in each instance at reflux under a nitrogen atmosphere for a period of 24 hours. The amounts of reactants employed and the results obtained are summarized in Table III.

TABLE III

| Moles of 2,5-dithiobiurea | Base employed | Moles of base | Volume of water (gal.) | Yield of dithiourazole (percent) |
|---|---|---|---|---|
| 800 | NaOH | 1,600 | 360 | <20 |
| 525 | $Na_2CO_3$ | 1,100 | 290 | 64 |

The very substantial difference in yield, i.e. a yield of less than 20 percent with sodium hydroxide as compared to 64 percent with sodium carbonate, is explainable by the fact that in equipment of the size used a substantial period of time is necessary to heat the solution to reflux. During this time period, reactions leading to unwanted by-products occur to a much greater extent with sodium hydroxide than with sodium carbonate.

As shown by the data in the above examples, a much better yield of dithiourazole is attainable by use of alkali metal carbonates in accordance with this invention, rather than alkali metal hydroxides as taught in the prior art. Particularly unexpected is the major difference in yield obtained when the reaction is carried out on a production scale.

The invention has been described in detail with particular reference to preferred embodiments thereof, but it will be understood that variations and modifications can be effected within the spirit and scope of the invention.

I claim:

1. A method of preparing dithiourazole comprising the steps of dissolving 2,5-dithiobiurea and an alkali metal carbonate in water in a proportion of at least about 0.5 mole of alkali metal carbonate per mole of 2,5-dithiobiurea and heating the resulting solution for a sufficient period of time to form dithiourazole.

2. The method as described in claim 1 wherein said solution is heated at reflux under an inert atmosphere for a period of at least about 20 hours.

3. The method as described in claim 1 wherein said alkali metal carbonate is employed in a proportion of at least about one mole per mole of 2,5-dithiobiurea.

4. The method as described in claim 1 wherein said alkali metal carbonate is employed in a proportion of from about 1.5 to about 4 moles per mole of 2,5-dithiobiurea.

5. The method as described in claim 1 wherein said alkali metal carbonate is sodium carbonate.

6. The method as described in claim 1 wherein said alkali metal carbonate is potassium carbonate.

References Cited

FOREIGN PATENTS 772,625   11/1967   Canada _____ 260—308

ALTON D. ROLLINS, Primary Examiner